United States Patent [19]
Harper

[11] 3,738,600
[45] June 12, 1973

[54] UNIVERSAL MOUNTING BRACKET

[76] Inventor: Bruce Melvin Harper, 213 Arbor Valley Center, San Jose, Calif. 95119

[22] Filed: Apr. 30, 1971

[21] Appl. No.: 139,036

[52] U.S. Cl. ............ 248/121, 248/129, 280/47.25, 297/130, 297/217
[51] Int. Cl. ............................................. B62b 1/02
[58] Field of Search .................. 248/121, 122, 129, 248/154, 204, 98, 96; 297/118, 130, 217; 280/47.25, 36, 47.38

[56] References Cited
UNITED STATES PATENTS

| 547,466 | 10/1895 | Whisler | 248/129 |
| 1,608,552 | 11/1926 | Ellis | 248/129 |
| 2,414,017 | 1/1947 | Carr et al. | 248/96 |
| 2,550,019 | 4/1951 | Murphy | 248/154 |
| 2,695,109 | 11/1954 | Pringle | 248/129 |
| 2,902,238 | 9/1959 | Tolman | 248/96 |
| 2,990,190 | 6/1961 | Eriksen | 280/47.25 |
| 3,079,166 | 2/1963 | Abgarian | 248/96 |

FOREIGN PATENTS OR APPLICATIONS

| 124,119 | 4/1947 | Australia | 248/129 |

Primary Examiner—Marion Parsons, Jr.

[57] ABSTRACT

A self-adjusting bracket that mounts a variety of plastic baby carry seats of varying dimensions onto a portable, lightweight stroller.

1 Claim, 3 Drawing Figures

Patented June 12, 1973  3,738,600

INVENTOR,
BRUCE M. HARPER
BY Bruce M Harper

UNIVERSAL MOUNTING BRACKET

BACKGROUND OF THE INVENTION

1. Field of the Invention

This invention relates to the mounting of a plastic infant carry seat onto improved baby strollers which primarily consist of a simple, lightweight frame designed to removeably receive lightweight plastic infant carry seats.

2. Description of Prior Art

The previously mentioned infant stroller had the limitation of not being able to accept a wide variety of baby carry seats (herein after referred to as "infant seats") available on the market without attaching a separate fastening fixture to each as a part of the seat. Thus, the stroller was severely limited in the scope of its application.

OBJECTS AND SUMMARY OF THE INVENTION

Accordingly, it is a primary object of this invention to increase the utility of the tot stroller by allowing a variety of the variously dimensioned infant seats to be securely and interchangeably mounted to the stroller frame.

Another object is that no special attachments or fixtures need be fastened to the infant seat, as an integral part of it, to make it useful with the stroller.

A further object is that the infant seat and the stroller may be purchased separately allowing the consumer complete freedom to purchase a preferred brand of infant seat.

An additional object is that a previously purchased infant seat is not obsoleted by the new infant stroller with a universal mounting bracket.

Still another object is that the tot stroller mounting bracket is fully self-adjustable and requires no special tools or adjustment to secure the infant seat to the stroller.

These and other objects of the invention are achieved by providing a seat base bracket of right angle cross section, transversely attached to the lower stroller frame in such a manner as to allow the rear, bottom edge of the infant seat to nestle into the bracket. The bracket prevents the seat from downward or backward movement.

Support for the top of the infant seat is provided by a bar transversely attached to the stroller frame supporting the head and shoulders region of the infant seat.

An elastic cord or tension spring, with a means of attaching the cord to the infant seat and stroller frame, firmly holds the infant seat into the lower support bracket.

A sliding clasp that can accommodate varying infant seat heights is mounted on the upper frame member to hold the upper region of the infant seat firmly against the top support bar.

A full understanding of the invention, of its further objects and advantages, and of the manner in which it may be carried out will be had from the following description, which is to be read in conjunction with the accompanying drawing. The particulars of that description are intended only for purposes of illustration and not as limitations upon the scope of the invention, which is defined in the appended claims.

A BRIEF DESCRIPTION OF THE DRAWING

Figure 1:
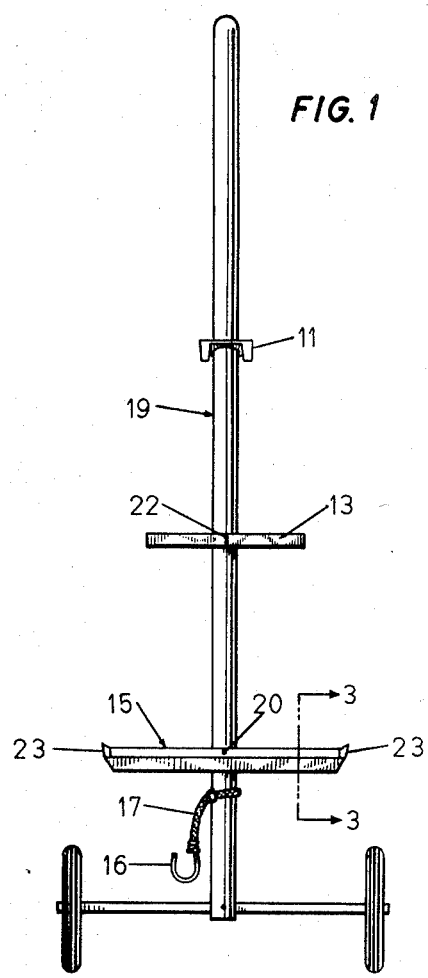
FIG. 1 is a front elevation view of the universal mounting bracket as it appears as part of the tot stroller.

As shown in the drawing, the preferred embodiment of the universal mounting bracket, as part of the tot stroller, includes four primary components:

the bottom seat support 15,
the top seat support 13,
the bottom seat fastener 17, and
the top seat fastener 11.

The stroller frame is generally referred to by the numeral 19.

Figure 3:
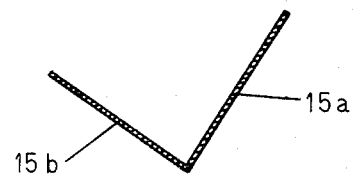
FIG. 3 is a section view of the bottom seat support taken from FIG. 1.
Figure 2:
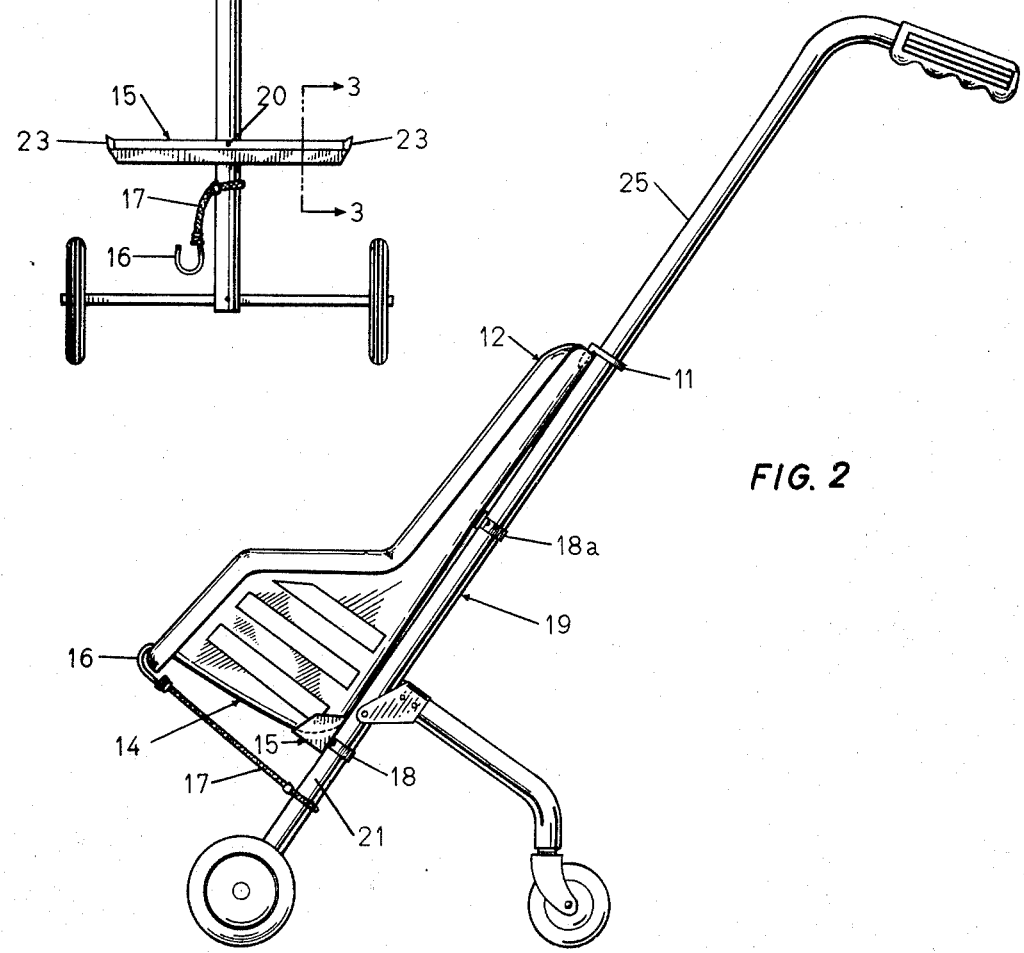
FIG. 2 is a side elevation view of the tot stroller with an infant seat in place illustrating the position and function of the component support brackets.

The bottom seat support 15 is located on the upper surface of the lower main frame section 21 where it positions and supports the bottom rear edge of the infant seat. The bottom seat support 15 is fabricated of metal or plastic and is of right angle cross section as is demonstrated in FIG. 3; the horizontal member 15b of the angle in FIG. 3 supports and positions the bottom of the infant seat while the vertical member 15a supports and positions the lower portion of the seat back. In addition, there are two end plates 23 which are inclined outward with respect to the horizontal and vertical angle members and serve to position and restrain the applied infant seat. The bottom seat support 15 is transversely mounted on, and at a right angle to, the lower main frame section 21 and fastened with rivets or screw 20 at the middle region of the vertical angle member 15a to the lower main frame section 21.

The bottom seat support 15 is further secured to the stroller frame by a brace 18, which consists of a V- or U-shaped strip of metal or plastic which is fastened at its ends to angle member 15a on either side of the frame and at its middle to the lower stroller frame 21 opposite the bottom seat support 15.

The top seat support 13 is located on the main frame section 19 above the bottom seat support 15 where it positions and supports the upper region of the applied infant seat. The top seat support is constructed of straight bar or strip metal or plastic and is transversely mounted to the upper surface of the main frame section 19 with screws or rivets 22. The top seat support is further secured to the stroller frame by brace 18a which is identical configuration and function to brace 18 as previously described.

The rear edge of the infant seat bottom 14 is held into the bottom support bracket by a tension fastener 17. Said fastener 17 consists of elastic cord or a tension spring which is fastened at one end to lower frame 21, and the other end of cord 17 has a hook 16 connected to it. To fasten the infant seat bottom 14 in place, the cord 17 is stretched a sufficient amount to allow hook 16 to engage the bottom front edge of the infant seat bottom 14. Upon release, the cord 17 contracts drawing the rear bottom edge of the infant seat into the lower seat support 15.

The top of the infant seat 12 is held in position by fastener 11. Said fastener is slidably mounted on the upper region of frame 25 and consists of a metal or plastic material with a downward protuberance which hooks over the top and front of the infant seat 12.

While, I have herein shown and described my invention in what I have conceived to be the most practical and preferred embodiment, it is recognized that departures can be made therefrom within the scope of my invention, which is not to be limited to the details disclosed herein but is to be accorded the full scope of the claims so as to embrace any and all equivalent structure.

I claim:

1. A seat mounting means for the purpose of attaching a variety of variously dimensioned infant seats to a simplified, portable baby stroller, comprising in combination:

A main support member of tubular configuration having a lower section and an upper section, a bottom seat support of angularly structured material with bounded ends transversely attached to the front surface of the lower main support section, a top seat support of bar material transversely attached to the front surface of the upper main support section, a seat bottom fastener utilizing a resilient cord which has one end connected to the main support section in the region of the bottom seat support and whose other end has a means of connecting to a portion of the infant seat in the lower region of the infant seat, a seat top fastener with a downward protuberance slideably mounted on upper main support section in such a fashion as to allow the downward protuberances to be slid down over the upper edge of the infant seat holding the seat top against the upper main support section.

* * * * *